(12) United States Patent
Chew et al.

(10) Patent No.: US 8,475,953 B2
(45) Date of Patent: Jul. 2, 2013

(54) ENERGY STORAGE UNIT FOR A MOTOR VEHICLE

(75) Inventors: Guan Chew, Bietigheim-Bissingen (DE); Miroslaw Oslislok, Leonberg (DE); Hartmut Chodura, Stuttgart (DE); Stefan Bender, Ludwigsburg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 182 days.

(21) Appl. No.: 13/053,630

(22) Filed: Mar. 22, 2011

(65) Prior Publication Data

US 2011/0236741 A1  Sep. 29, 2011

(30) Foreign Application Priority Data

Mar. 26, 2010  (DE) .......................... 10 2010 013 012

(51) Int. Cl.
 *H01M 6/44* (2006.01)
(52) U.S. Cl.
 USPC .......................................... 429/153; 429/120
(58) Field of Classification Search
 USPC .................................. 429/120, 153
 See application file for complete search history.

(56) References Cited

U.S. PATENT DOCUMENTS

| 5,158,841 | A | 10/1992 | Mennicke et al. |
|---|---|---|---|
| 2006/0216583 | A1 | 9/2006 | Lee et al. |
| 2009/0075162 | A1 | 3/2009 | Takahashi |
| 2011/0027641 | A1 | 2/2011 | Rejman |
| 2011/0159340 | A1* | 6/2011 | Hu et al. ................. 429/120 |
| 2011/0189523 | A1* | 8/2011 | Eom ....................... 429/120 |
| 2011/0195290 | A1 | 8/2011 | Koenigsmann |

FOREIGN PATENT DOCUMENTS

| DE | 40 13 269 A1 | 10/1991 |
|---|---|---|
| DE | 60 2006 000 126 T2 | 7/2008 |
| DE | 10 2007 063 174 A1 | 6/2009 |
| DE | 11 2008 000 007 T5 | 9/2009 |
| DE | 10 2008 000 834 A1 | 10/2009 |
| DE | 10 2008 034 870 A1 | 1/2010 |
| DE | 11 2008 000 855 T5 | 1/2010 |
| JP | 4230962 A | 8/1992 |
| JP | 9120835 A | 5/1997 |
| JP | 2009-140786 A | 6/2009 |
| JP | 2009-176464 A | 8/2009 |
| WO | WO 2010/023063 A1 | 3/2010 |

\* cited by examiner

*Primary Examiner* — Tracy Dove
(74) *Attorney, Agent, or Firm* — RatnerPrestia

(57) ABSTRACT

An energy store for a motor vehicle for storage and emission of electrical energy as required, having a multiplicity of cells which are positioned one above the other and/or alongside one another like an array, wherein each cell is surrounded by a first material, wherein a second material is positioned between the cells which are surrounded by the first material and form a cell array, and wherein heat exchanging ribs are positioned at edges of the cell array.

13 Claims, 1 Drawing Sheet

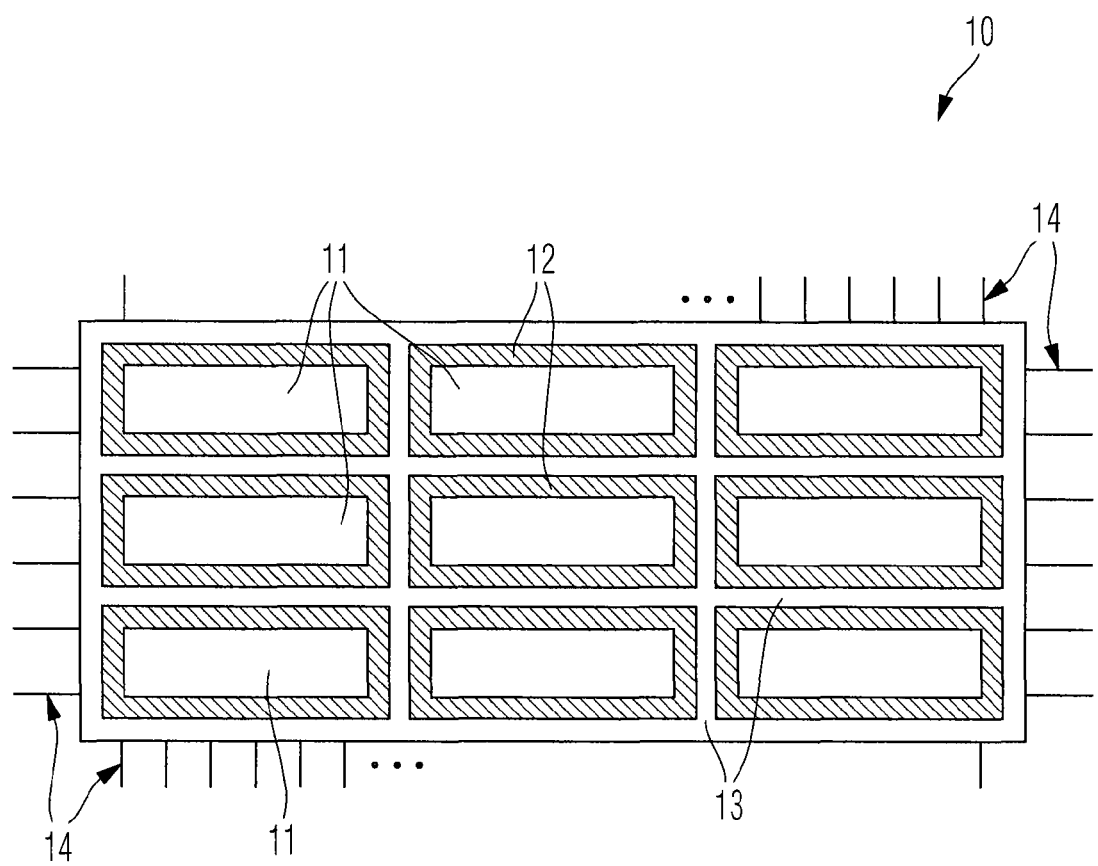

ENERGY STORAGE UNIT FOR A MOTOR VEHICLE

CROSS REFERENCE TO RELATED APPLICATION

This U.S. patent application claims priority to German Patent Application DE 10 2010 013 012.5, filed Mar. 26, 2010, which is incorporated by reference herein in its entirety.

FIELD OF THE INVENTION

The invention relates to an energy store for a motor vehicle for storage and emission of electrical energy.

BACKGROUND OF THE INVENTION

A motor vehicle having a hybrid drive or a pure electrical drive has an electrical energy store for storage and emission of electrical energy as required. Therefore, when an electrical machine in the hybrid drive or electrical drive is being operated as a motor, an electrical energy store emits electrical energy to drive the electrical machine. In contrast, when an electrical machine in the hybrid drive or electrical drive is being operated as a generator, the same charges the electrical energy store, such that electrical energy can be stored therein.

Electrical energy stores which are known from practical use for a hybrid drive or electrical drive generally have a multiplicity of cells which are positioned one above the other and/or alongside one another like an array. When the energy store is being charged in order to store electrical energy and when the electrical energy store is being discharged in order to emit electrical energy, heat is created in the cells of the energy store, which must be dissipated from the electrical energy store in order to prevent it from overheating, and therefore to prevent temperature-dependent damage to it. In some circumstances, it is also necessary to prevent the cells from being excessively cooled.

Until now, effective temperature control of electrical energy stores for a hybrid drive or electrical drive in a motor vehicle has presented difficulties. There is therefore a need for an energy store for a hybrid drive or electrical drive for a motor vehicle, in which overheating and, possibly, undercooling of cells therein can be reliably and easily avoided, that is to say an energy store which has effective temperature control and allows the cells to be operated in a defined temperature range which is optimum for performance and optimum for life.

Against this background, the present invention is in this case relates to the object of providing a novel energy store for a hybrid drive.

SUMMARY OF THE INVENTION

This object is achieved by an energy store for a motor vehicle for storage and emission of electrical energy as required, having a multiplicity of cells which are positioned one above the other and/or alongside one another like an array, characterized in that each cell is surrounded by a first material, in that a second material is positioned between the cells which are surrounded by the first material and form a cell array, and in that heat exchanging ribs are positioned at edges of the cell array. According to aspects of the invention, each cell is surrounded by a first material, wherein a second material is positioned between the cells which are surrounded by the first material and form a cell array, and wherein heat exchanging ribs are positioned at the edges of the cell array.

The present invention in this case proposes an energy store whose individual cells are surrounded by a first material. The cells which are surrounded by the first material and form a cell array are surrounded by a second material. The second material is accordingly positioned between the cells which are surrounded by the first material. Heat exchanging ribs are provided externally at the edges of the cell array.

This configuration of an electrical energy store for a motor vehicle, specifically a motor vehicle having a hybrid drive or a pure electrical drive, which in principle uses three measures for effective temperature control of the cells, makes it possible to achieve simple and reliable as well as effective temperature control, in particular cooling, of the electrical energy store.

According to one advantageous development of the invention, the first material has a high heat capacity, absorbs heat which is created in the cells or emits heat to them, and thus ensures a uniform temperature distribution at least on one surface of the cells.

The first material is preferably a ceramically filled silicon material.

According to a further advantageous development of the invention, the second material has a high thermal conductivity and dissipates heat from the cells, specifically from the first material which surrounds the cells, in the direction of the heat exchanging ribs, or conversely the second material conducts heat from the heat exchanging ribs in the direction of the cells, specifically the first material which surrounds the cells.

The second material is preferably a graphite material.

According to a further advantageous development of the invention, a medium can flow around the heat exchanging ribs which are positioned at the edges of the cell array.

The heat exchanging ribs are preferably metallic heat exchanging ribs.

BRIEF DESCRIPTION OF THE DRAWINGS

Preferred developments of the invention will become evident from the dependent claims and the following description. Exemplary embodiments of the invention will be explained in more detail with reference to the drawing, without being restricted thereto. In the FIGURE:

FIG. 1: shows a schematic view of an energy store according to aspects of the invention for a motor vehicle.

DETAILED DESCRIPTION OF THE PREFERRED EMBODIMENTS

The present invention in this case relates to an electrical energy store 10 for a motor vehicle, specifically for a motor vehicle having a hybrid drive or having a pure electrical drive.

The electrical energy store 10 is used to store and emit electrical energy as required during operation of motor vehicles. When an electrical machine in the hybrid drive or electrical drive in the motor vehicle is being operated as a motor, the energy store 10 emits electrical energy stored in it in order to drive the respective electrical machine. When an electrical machine in the hybrid drive or electrical drive is being operated as a generator, the energy store 10 is charged to a relatively major extent by the electrical machine, in order to store electrical energy in it.

The electrical energy store 10 which is illustrated schematically in FIG. 1 has a multiplicity of cells 11, which are positioned one above the other and/or alongside one another, forming a cell array. The cells 11 can also be referred to as battery cells or rechargeable battery cells.

In particular, the cells 11 are lithium-ion cells, which are also referred to as lithium-ion battery cells or as lithium-ion rechargeable battery cells.

Each cell 11 in the energy store 10 is surrounded by a first material 12. The cells 11 are preferably each surrounded by the first material 12 on all sides.

In particular, the first material 12 has a high heat capacity in order that it can absorb heat created in the cells 11 or, conversely, can emit heat to them, and can ensure that there is a uniform temperature distribution at least on one surface of the cells 11.

The surface of the cells 11 is essentially flat, but uneven and therefore structured. This enlarges the surface area of the cells 11, in order to ensure that heat is transferred more effectively between the cells 11 and the first material 12.

A refinement of the invention is particularly preferable in which the first material 12, which preferably surrounds the individual cells 11 on all sides, is in the form of a ceramically filled silicon material, in particular a silicon material filled with boron nitride.

Therefore, by way of example, the material 12 may be in the form of ceramically filled silicon plates or a ceramically filled silicon gel.

In particular, the first material is in the form of silicon plates filled with boron nitride, or a silicon gel filled with boron nitride.

In particular, the first material 12 may also be a material whose phase is not stable when heat is absorbed and conversely also when heat is emitted, but changes its phase or its aggregate state from solid to liquid or from solid to gaseous, or from liquid to gaseous, or vice versa. A material such as this is then surrounded by a casing whose phase is stable.

As can be seen from FIG. 1, a second material 13 is positioned between the cells 11, which are surrounded by the first material 12 and are positioned one above the other and/or alongside one another to form the cell array. The second material 13 preferably surrounds the cells 11 which are surrounded by the first material 12, on all sides.

In particular, the second material 13 has a high thermal conductivity, in order in particular to dissipate heat from the cells, specifically from the first material 12 which surrounds the cells. Conversely, heat can also be passed in the direction of the cells 11 via the second material 12.

In particular, the second material 13 is a graphite material or else a metallic material.

In order to ensure that the electrical energy store 10 is relatively light in weight, it is preferable to use a graphite material as the second material 13.

Heat exchanging ribs 14 are positioned at edges of the cell array, which comprises the cells 11 which are surrounded by the first material 12, and the second material 13, which surrounds the cells 11 which are surrounded by the first material 12. A medium, for example a gaseous or liquid medium, preferably flows around the heat exchanging ribs 14, and said heat exchanging ribs 14 emit heat to the medium via the second material 13 in the direction of the cooling ribs 14. Conversely, they can also absorb heat from the medium flowing around them.

In this case, the heat exchanging ribs 14 are preferably manufactured from a metallic material, in particular from copper, aluminum or steel.

The electrical energy store 10 according to aspects of the invention uses three measures for effective temperature control, in particular cooling, thereof. The first measure comprises the first material 12, which preferably surrounds the individual cells 11 on all sides and ensures that there is a uniform temperature distribution at least on the surface of the cells 11. The second measure is formed by the second material 13, which has a relatively high thermal conductivity and surrounds, preferably on all sides, the cells 11 which are surrounded by the first material 12 and form the cell array. The third measure is provided by the heat exchanging ribs 14 which, in the end, emit the heat which has been dissipated from the cells 11 via the first material 12 and the second material 13, to a medium which flows around the heat exchanging rib 14.

Since the medium flows exclusively externally around the electrical energy store, at its edges in the area of the outer heat exchanging ribs 14, and no medium is passed through the electrical energy store 10 between the individual cells 11, the electrical energy store 10 can be very largely separated from the medium, thus improving its operational reliability. Furthermore, the individual cells 11 can be positioned more closely together, thus resulting in physical space advantages.

| List of reference symbols | |
|---|---|
| 10 | Energy store |
| 11 | Cell |
| 12 | First material |
| 13 | Second material |
| 14 | Heat exchanging rib |

The invention claimed is:

1. An energy storage unit for a motor vehicle for storage and emission of electrical energy comprising:
   a multiplicity of cells which are positioned in a cell array one above the other or alongside one another,
   a first material encapsulating each cell,
   a second material positioned between the cells, which are encapsulated by the first material, and
   heat exchanging ribs positioned at edges of the second material.

2. The energy storage unit as claimed in claim 1, wherein every side of the cells is surrounded by the first material.

3. The energy storage unit as claimed in claim 1, wherein the first material has a high heat capacity, absorbs heat which is created in the cells or emits heat to them, and facilitates a uniform temperature distribution on at least one surface of the respective cells.

4. The energy storage unit as claimed in claim 1, wherein the first material is a ceramically filled silicon material.

5. The energy storage unit as claimed in claim 1, wherein the first material is a silicon material filled with boron nitride.

6. The energy storage unit as claimed in claim 1, wherein the second material surrounds the cells on all sides.

7. The energy storage unit as claimed in claim 1, wherein the second material has a high thermal conductivity and dissipates heat from the first material in a direction of the heat exchanging ribs, or conversely conducts heat from the heat exchanging ribs in a direction toward the first material.

8. The energy storage unit as claimed in claim 1, wherein the second material is a graphite material.

9. The energy storage unit as claimed in claim 1, wherein the second material is a metallic material.

10. The energy storage unit as claimed in claim 1, wherein the heat exchanging ribs are composed of a metallic material.

11. The energy storage unit as claimed in claim 1, wherein a medium can flow around the heat exchanging ribs.

12. The energy storage unit as claimed in claim 1, wherein the second material is different than the first material.

13. The energy storage unit as claimed in claim 1, wherein the cells are either battery cells or rechargeable battery cells.

\* \* \* \* \*